United States Patent
Pollett

(10) Patent No.: US 9,682,519 B2
(45) Date of Patent: Jun. 20, 2017

(54) INTEGRAL COMPOSITE BUSHING SYSTEM AND METHOD

(71) Applicant: Aurora Flight Sciences Corporation, Manassas, VA (US)

(72) Inventor: Brandon Pollett, Vienna, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 286 days.

(21) Appl. No.: 14/341,083

(22) Filed: Jul. 25, 2014

(65) Prior Publication Data

US 2015/0030389 A1 Jan. 29, 2015

Related U.S. Application Data

(60) Provisional application No. 61/858,909, filed on Jul. 26, 2013.

(51) Int. Cl.

| | |
|---|---|
| F16C 17/00 | (2006.01) |
| E04G 7/00 | (2006.01) |
| B29C 70/88 | (2006.01) |
| B29C 70/54 | (2006.01) |
| B29C 70/30 | (2006.01) |
| B64C 1/00 | (2006.01) |
| B29L 31/00 | (2006.01) |

(52) U.S. Cl.
CPC ............ *B29C 70/887* (2013.01); *B29C 70/30* (2013.01); *B29C 70/545* (2013.01); *B29L 2031/737* (2013.01); *B64C 2001/0072* (2013.01); *Y02T 50/433* (2013.01); *Y10T 403/74* (2015.01)

(58) Field of Classification Search
CPC ........ F16C 33/043; F16C 23/02; F16C 25/02; F16C 31/02; F16C 33/24

USPC .... 384/26, 42, 129, 275–276, 282, 297–298
See application file for complete search history.

(56) References Cited

U.S. PATENT DOCUMENTS

| | | | |
|---|---|---|---|
| 4,155,797 A * | 5/1979 | Schneider | B29D 22/00 |
| | | | 156/180 |
| 4,763,399 A | 8/1988 | Roe | |
| 6,619,847 B1 * | 9/2003 | Ishikawa | F16C 17/02 |
| | | | 384/100 |
| 6,969,551 B2 | 11/2005 | Richardson et al. | |
| 2006/0090673 A1 | 5/2006 | Simmonsen et al. | |
| 2010/0065688 A1 | 3/2010 | Wood | |
| 2010/0320320 A1 | 12/2010 | Kismarton | |
| 2013/0195388 A1 * | 8/2013 | Ishii | F16C 33/22 |
| | | | 384/322 |
| 2013/0212907 A1 * | 8/2013 | Dua | A43B 23/0245 |
| | | | 36/83 |
| 2013/0224022 A1 * | 8/2013 | Cabrera | B64C 27/48 |
| | | | 416/134 A |

OTHER PUBLICATIONS

Dictionary.com—definition of "disk". Copyright 2016.*

* cited by examiner

*Primary Examiner* — David Sample
*Assistant Examiner* — Nicole T Gugliotta
(74) *Attorney, Agent, or Firm* — Michael Stanley Tomsa; McAndrews, Held & Malloy, Ltd.; Eugene H. Nahm

(57) ABSTRACT

A composite bearing comprising a densified portion, wherein a hole location is positioned at the approximate center of said densified portion; and a plurality of filament tendrils, wherein the plurality of filament tendrils are configured to wrap around the hole location to create a "U" shape.

20 Claims, 15 Drawing Sheets

Figure 2a  Tension failure

Figure 2b  Shear-out failure

Figure 2c  Bearing failure

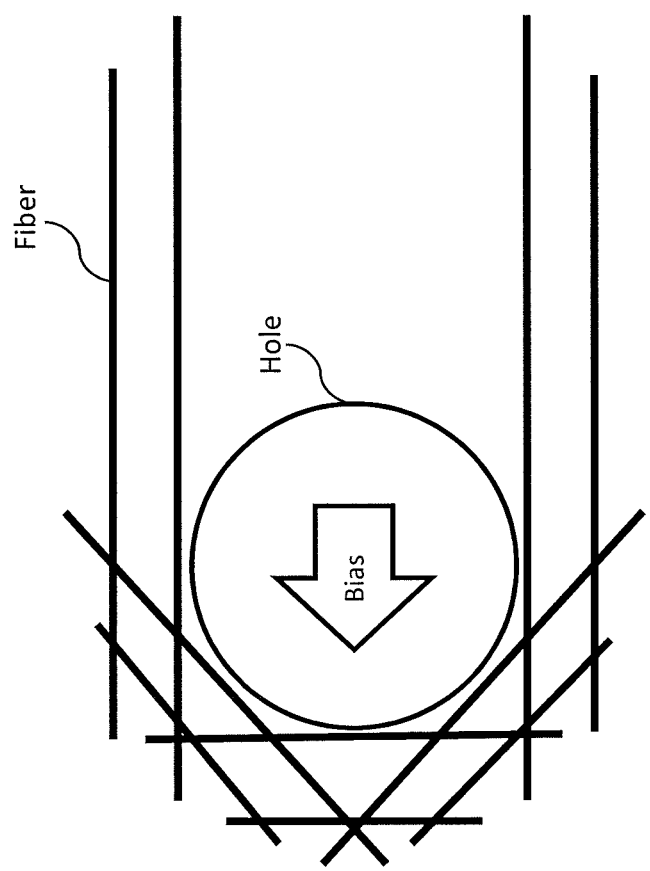

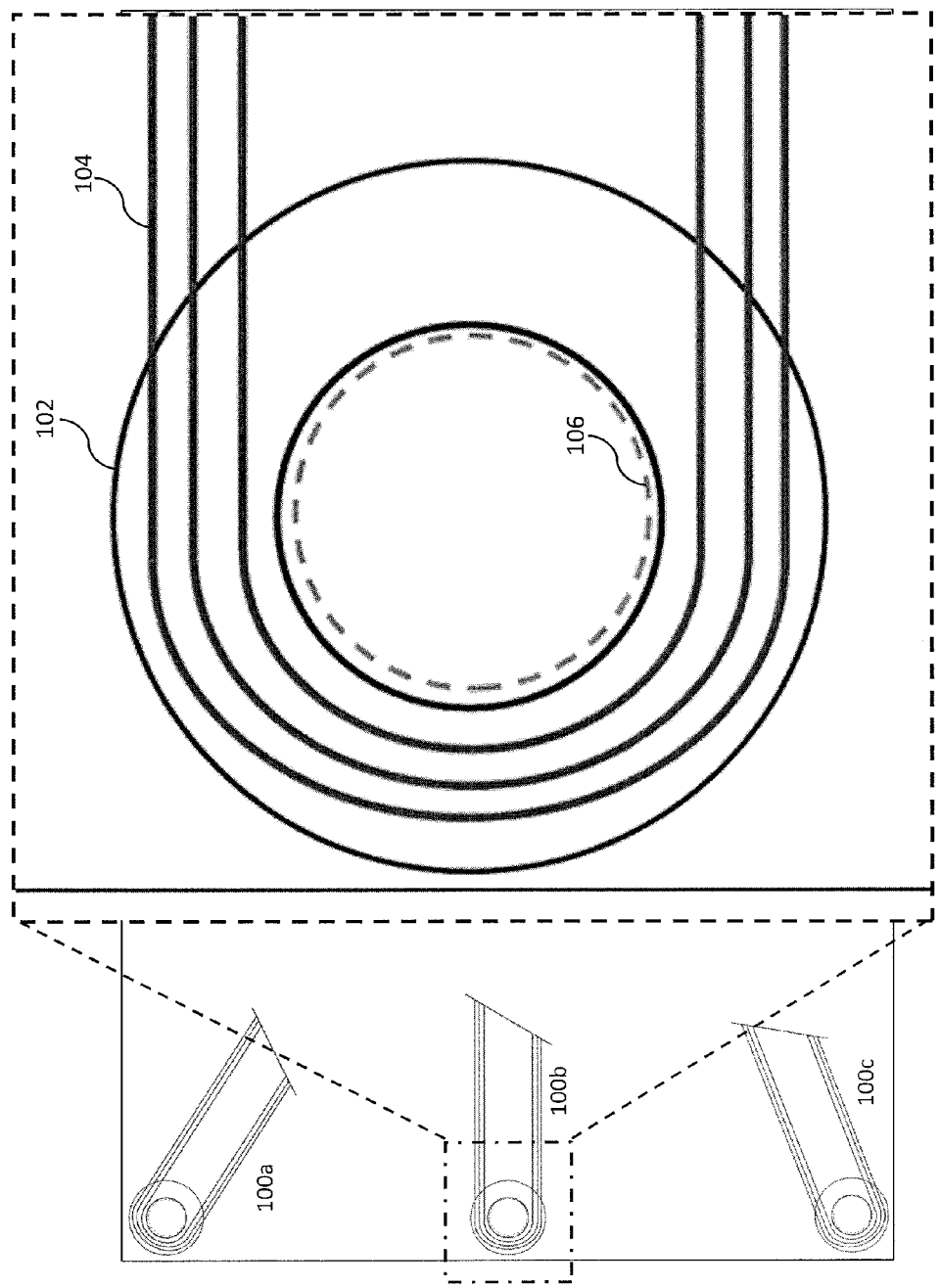

INTEGRAL COMPOSITE BUSHING SYSTEM AND METHOD

CROSS-REFERENCE TO RELATED APPLICATIONS

This application claims priority to U.S. Provisional Patent Application No. 61/858,909, filed on Jul. 26, 2013, entitled "Integral Composite Bearing System And Method," by Brandon Pollett, which is hereby incorporated by reference in its entirety.

TECHNICAL FIELD

The present invention is directed to systems and methods for increasing the strength of a composite structure, specifically, increasing the strength of a fastening point within a composite structure. More specifically, increasing bearing strength and for providing integral composite bearings to resist bearing failure.

BACKGROUND

Traditional metal aircraft structures are fastened with rivets, hi-loks fasteners, or equivalent sheer fasteners. However, composite materials differ from metals in that they have quasi-isentropic properties, which raises two issues in fastening composite structures. The first issue is in drilling the holes. Drilling or punching a hole in a composite structure severs the continuous fibers and effectively isolates the load carrying capability of the fibers between the hole and the edge of the composite structure. This requires the placement of additional edge material to separate the hole from the edge of the composite structure (e.g., an aircraft component, such as a panel), which increases the cost, weight, and manufacturing time of the component. The second issue is due to bearing weakness in the composites. This is caused by the composite's low out-of-plane sheer resistance. Due to this factor, most composites are sized to a critical bearing load, not to a strength load.

While a number of composite washers that focus on sealing and conforming to contour have been disclosed, these composite washers do not add any structural benefit to the composite structure. Similarly, there exist composite fasteners that also focus primarily on sealing the hole, however, they do not transfer load within the composite structure. Moreover, a variety of inserts for potted cores exist, but they are primarily independent fasteners that are added after the manufacturing of the panel and do not use fibers to transfer load into the panel.

There are methods for providing integral reinforcements of sheet metal structures, such as automotive panels. However, these methods are directed at metal, and would cause delamination if used in a composite structure. For example, U.S. Pat. No. 6,969,551 describes a method and assembly for fastening and reinforcing a structural member (e.g., an automotive vehicle pillar, such as an automotive "B" pillar). The assembly preferably includes a structural member having a first and a second portion defining a cavity therebetween. An expandable reinforcement material, such as an epoxy-based reinforcement material, and a spacer may be disposed within the cavity. The assembly also typically includes a fastener or fastening assembly. In operation, the spacer preferably assists in supporting the first and second portions of the structural member during changes of state (e.g., softening) of the reinforcement material.

Other methods address ensuring the integrity of the panel during impact, but are not designed for the purpose of transferring load from a fastener. For example, U.S. Patent Publication No. 2006/0090673 discloses a composite structure having front and back faces, the panel comprising facing reinforcement, backing reinforcement, and matrix material binding to the facing and backing reinforcements, the facing and backing reinforcements each independently comprising one or more reinforcing sheets, the facing reinforcement being located on or embedded in matrix material adjacent to the front face of the panel, the backing reinforcement being located in a plane or planes substantially parallel to the plane or planes of the facing reinforcement, and being substantially coextensive therewith, and spaced therefrom by matrix material, the facing and backing reinforcements being interconnected to resist out-of-plane relative movement. The reinforced composite structure is useful as a barrier element for shielding structures, equipment, and personnel from blast and/or ballistic impact damage.

Other methods address reinforcement of composite joints, focusing on adding reinforcement after layup, but do not involve components integral to the structure. For example, U.S. Patent Publication No. 2010/0320320 discloses a structure for an aerospace vehicle having a composite beam chord clamped between the first and second metal plates. The beam chord is clamped at a force that precludes or reduces beam chord delamination under axial loading during operation of the vehicle. Yet, other methods for fastener reinforcement involve double-plys, but fail to specify any unique components specifically focused on bearing load or edge distance optimization. For example, U.S. Patent Publication No. 2010/0065688 discloses a computer-implemented method and apparatus for creating a structural joint for an aircraft. A first composite component and a second composite component are co-joined to form the structural joint for the aircraft. A hole through the first composite component and the second composite component is created. A composite shear pin is placed through the hole. A composite collar is bonded to the composite shear pin with an adhesive. Finally, other methods utilize a metal spray that wicks into the laminate after a hole is drilled. For example, U.S. Pat. No. 4,763,399 discloses a method of strengthening a bolt hole in a fibrous composite laminate when a hole is drilled in a laminate sheet. The method allows for increased thickness strength, bearing strength, and the use of low-cost, high-strength fasteners, which may or may not be galvanically compatible through the use of plating the edges of the holes with a metal spray.

As set forth above, current methods include adding additional plys around holes and requiring large edge distances. However, such current methods result in an increase in material, and therefore, an increase in weight and cost for each part. Accordingly, a need exists for a system and method to increase the strength of composite materials without increasing the weight or cost for each part.

BRIEF SUMMARY OF THE INVENTION

As set forth below, an integrated composite bearing, which may be added to a composite structure during composite layup, may function as a support structure (or bearing) within the composite structure. This integrated composite bearing, increases the bearing strength as well as more effectively transfer load from the fastener to the panel.

According to a first aspect of the present invention, a composite aircraft structure comprises: a body portion having a first density; a disk-shaped densified portion comprising ceramic, metal, high-strength plastic, or a combination thereof, wherein the disk-shaped densified portion is configured to receive a hole positioned at an approximate center of said disk-shaped densified portion, wherein, the densified portion has a density that is greater than said first density and is configured to resist a load imparted via said hole; and a plurality of filament tendrils, wherein, the plurality of filament tendrils are configured to wrap around at least a portion of said hole to form a form a "U" shape, wherein at least one of said plurality of filament tendrils comprises a carbon fiber material, a para-aramid synthetic fiber material, or a fiberglass material, wherein, said plurality of filament tendrils direct stress away from said hole and into the body portion.

According to a second aspect of the present invention, a composite bearing for use in a composite structure comprises: a densified portion, wherein the densified portion is configured to receive a hole positioned at an approximate center of said densified portion; and a plurality of filament tendrils, wherein the plurality of filament tendrils are configured to encircle at least a portion of said hole, wherein the densified portion is configured to resist a load imparted upon the composite bearing, wherein plurality of filament tendrils direct stress away from the composite bearing and into the composite structure.

According to a third aspect of the present invention, a composite structure comprises: a body portion; a densified portion, wherein the densified portion is configured to receive a hole positioned at an approximate center of said densified portion; and a plurality of filament tendrils, wherein, the plurality of filament tendrils are configured to wrap around at least a portion of said hole, wherein, the densified portion is configured to resist a load imparted via said hole, wherein, said plurality of filament tendrils direct stress away from said hole and into the body portion.

In certain aspects, the plurality of filament tendrils form a "U" shape around said at least a portion of said hole.

In certain aspects, the composite bearing is disk-shaped.

In certain aspects, the plurality of filament tendrils direct stress away from the composite bearing.

In certain aspects, at least one of said plurality of filament tendrils comprises a carbon fiber material, a para-aramid synthetic fiber material, and/or a fiberglass material.

In certain aspects, said densified portion's diameter is approximately 1.5 to 3 times said hole's diameter.

In certain aspects, said densified portion comprises ceramic, metal, high-strength plastic, or a combination thereof.

BRIEF DESCRIPTION OF THE FIGURES

These and other advantages of the present invention will be readily understood with reference to the following specifications and attached drawings, wherein:

FIG. 9a illustrates a close-up diagram of fibers under moderate-bearing loads;

FIGS. 11a through 11c illustrates an example composite structure having a plurality of Integrated Composite Bearings install therein.

DETAILED DESCRIPTION OF THE INVENTION

Preferred embodiments of the present invention will be described hereinbelow with reference to the accompanying drawings. In the following description, certain well-known functions or constructions are not described in detail since they would obscure the invention in unnecessary detail. For this application, the following terms and definitions shall apply:

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, FML, etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

The term "composite laminates" as used herein, refers to a type of composite material assembled from layers (i.e., a "ply") of additive material and a matrix material.

The term "composite structure" as used herein, refers to structures, or components, fabricated, at least in part, using a composite material, including, without limitation, composite laminates including, without limitation, composite panels.

As discussed above, existing bearing reinforcement methods involve adding additional plys around holes and requiring large edge distances, thereby resulting in an increase in material, and therefore, an increase in manufacturing time, weight and cost for each part. Accordingly, a need exists for a system and method to increase the strength of composite materials without suffering from such limitations.

Figure 1:
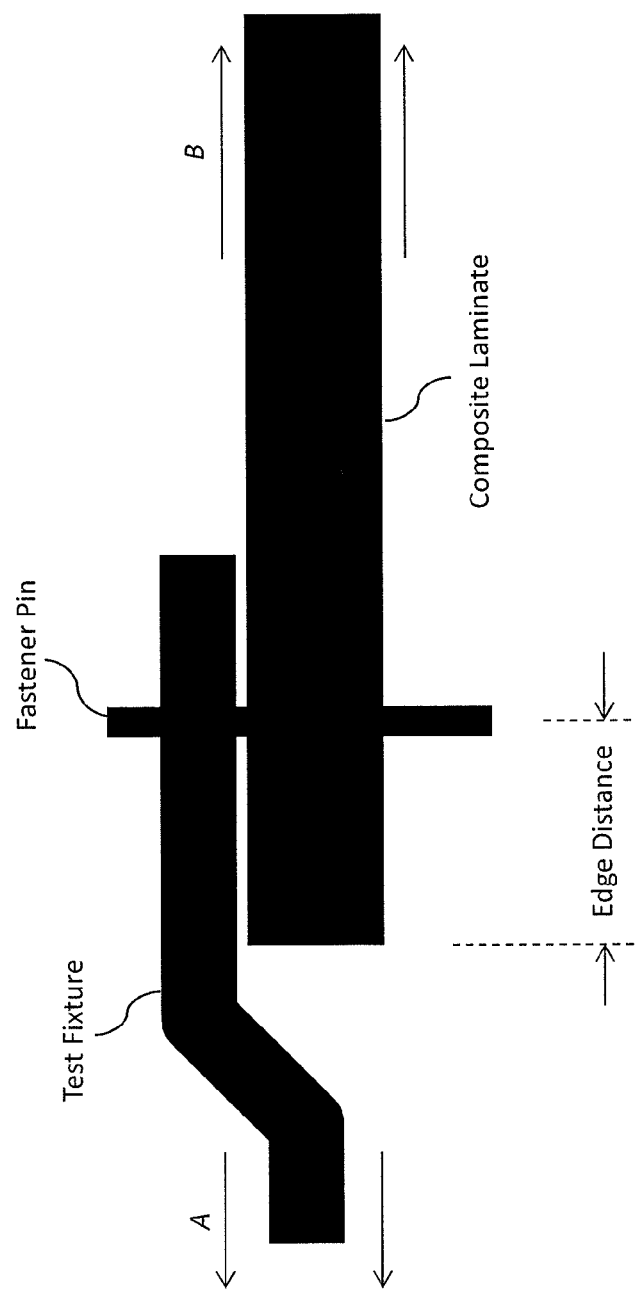
FIG. 1 illustrates an example single-shear testing method setup.
Figure 2:
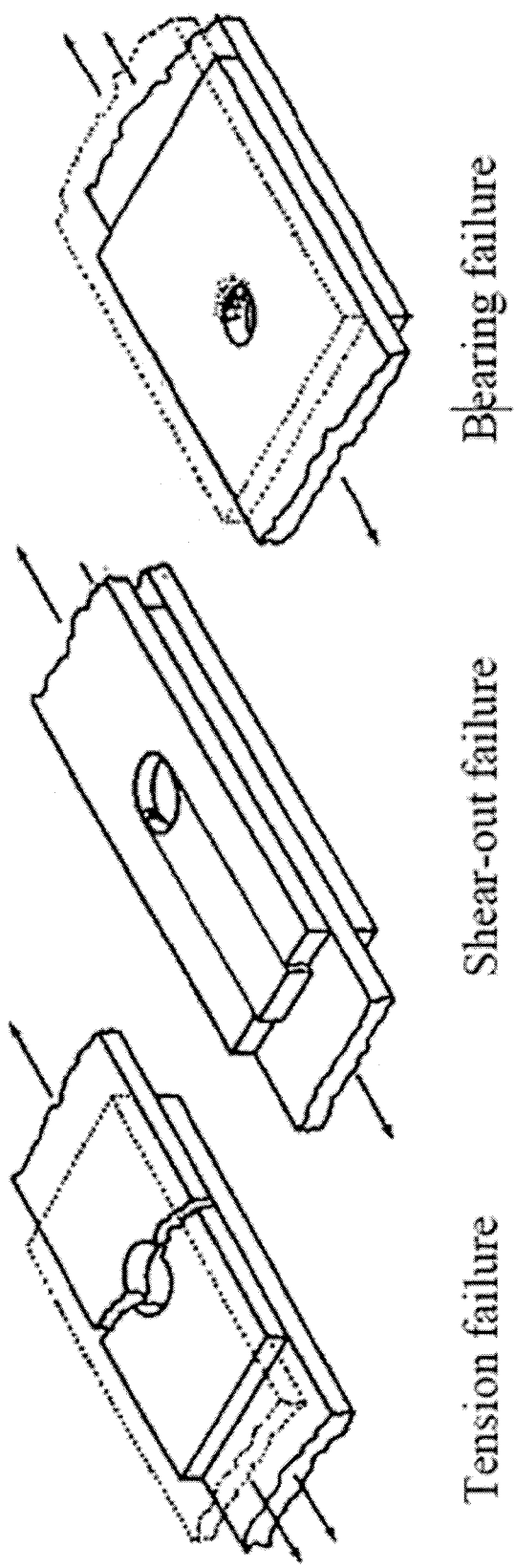
FIG. 2a illustrates an example tension failure for the pinned-joint configuration of FIG. 1.
FIG. 2b illustrates an example shear-out failure for the pinned-joint configuration of FIG. 1.
FIG. 2c illustrates an example bearing failure for the pinned-joint configuration of FIG. 1.
Figure 3:
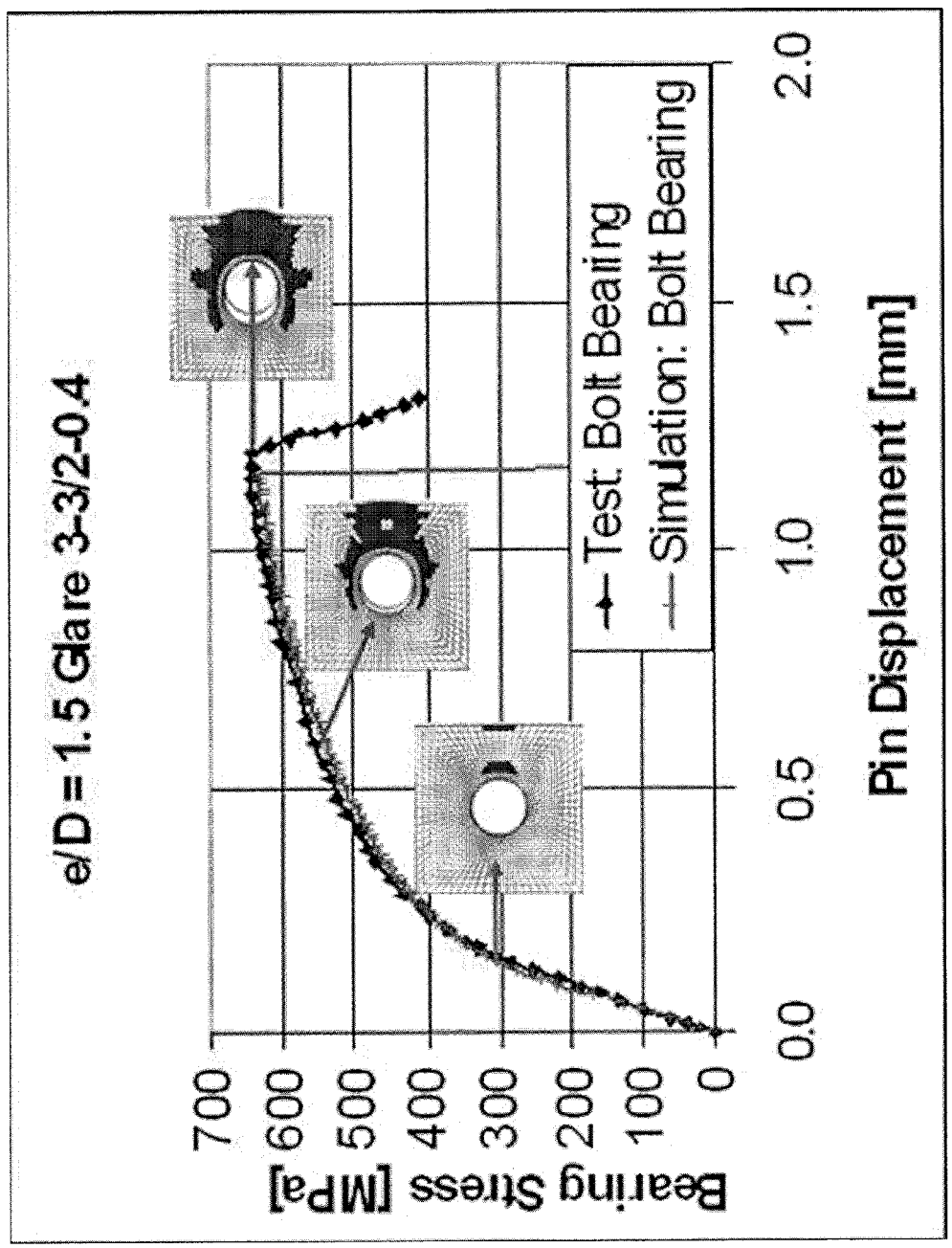
FIG. 3 is a graph illustrating bearing stress vis-à-vis pin displacement.
Figure 4:
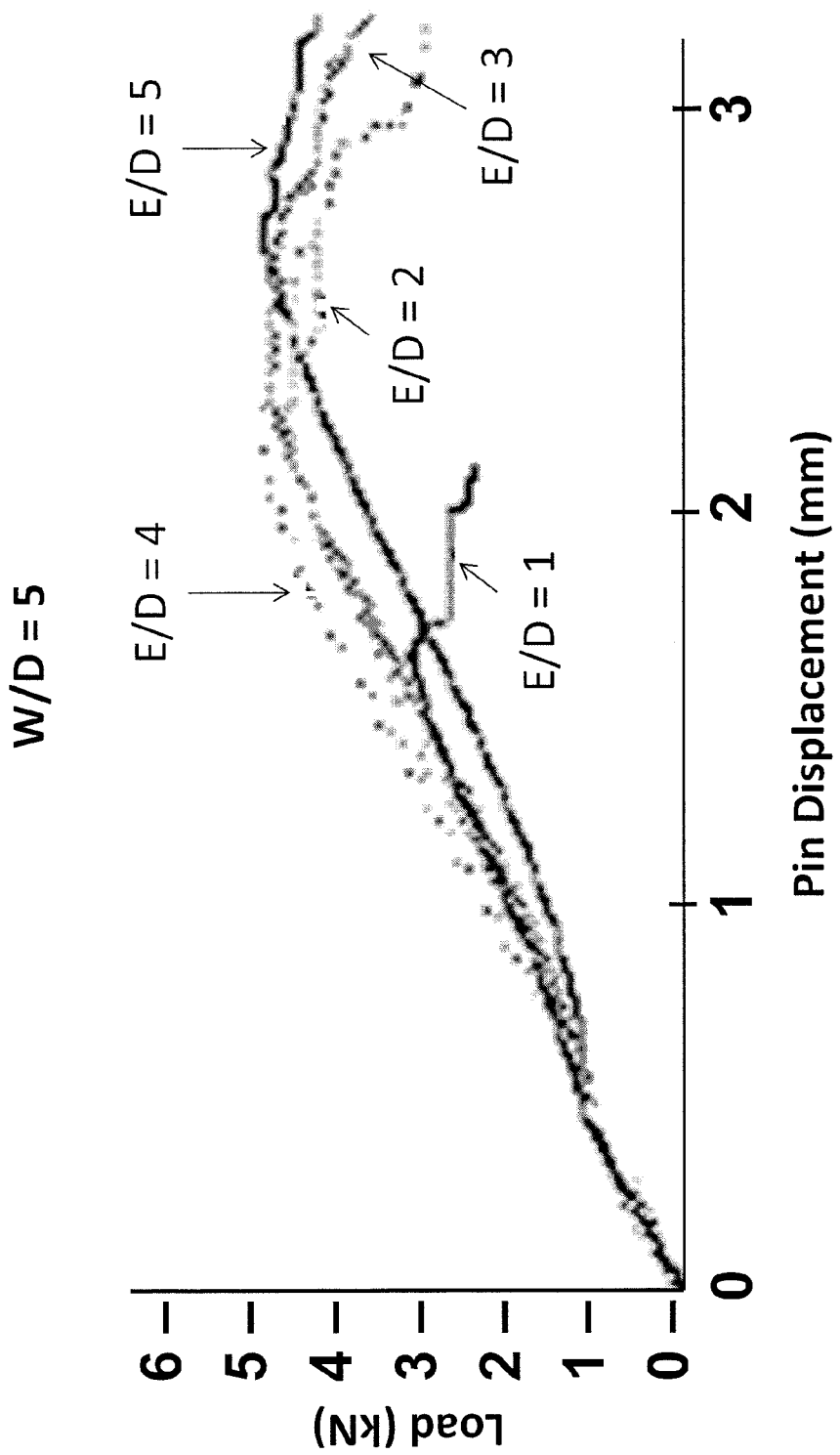
FIG. 4 is a graph illustrating load-displacement curve for pin-loaded (90/±45) laminates.
Figure 5B:
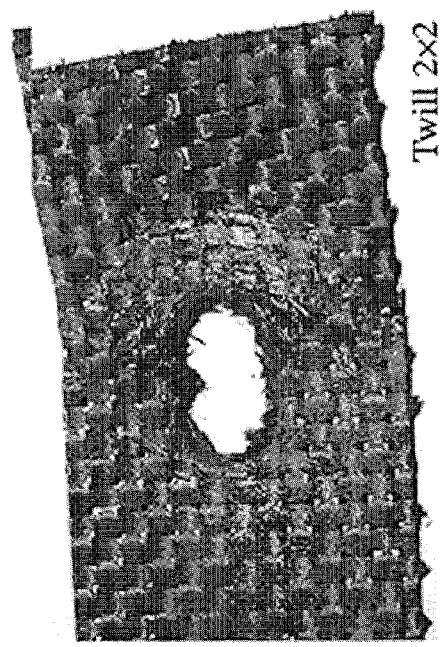
FIGS. 5a through 5d illustrate images of example bearing failures.
Figure 5D:
Figure 5A:
Figure 5C:
Figure 6:
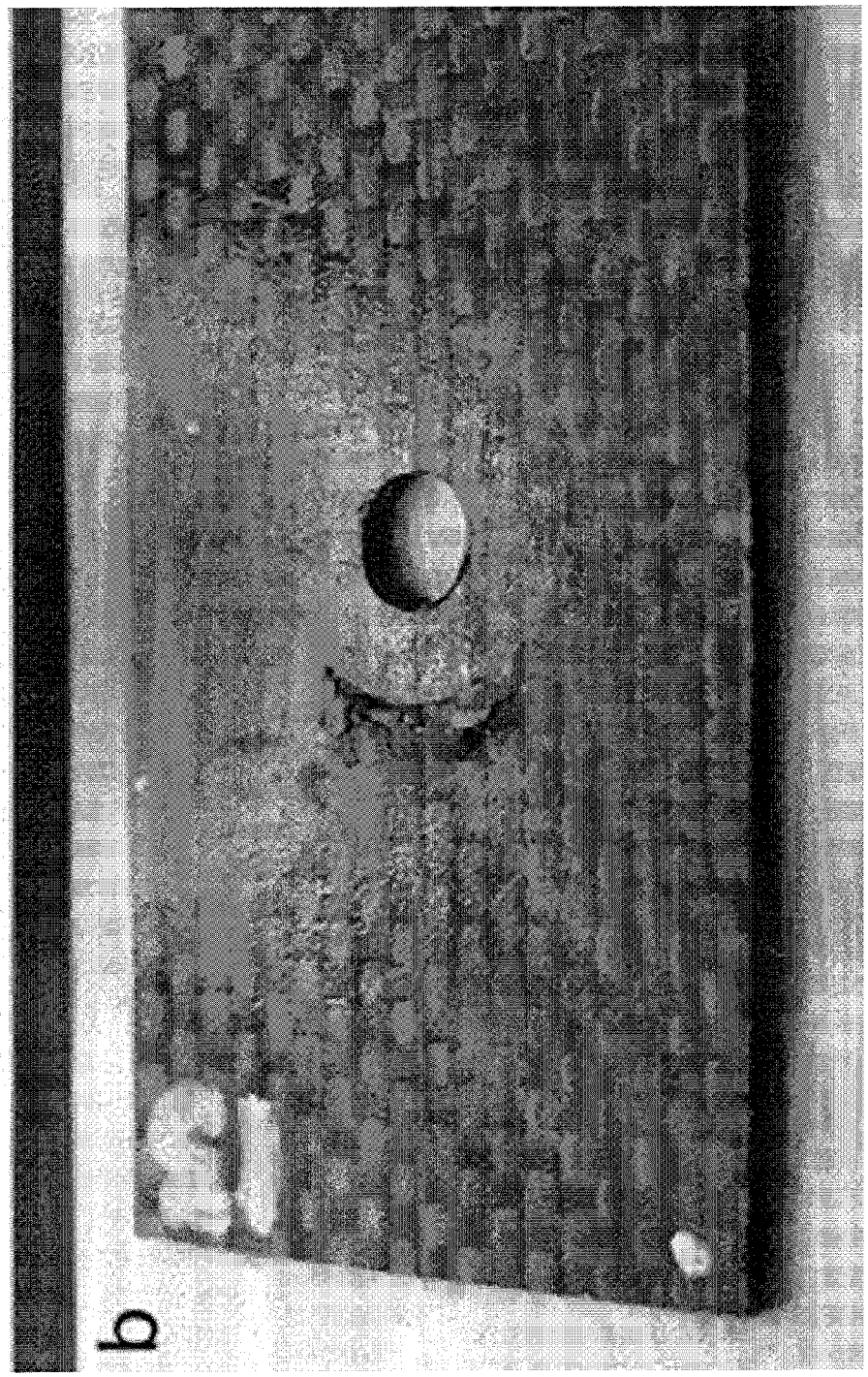
FIG. 6 illustrates an example bearing failure while using a bolt and washer.
Figure 7:
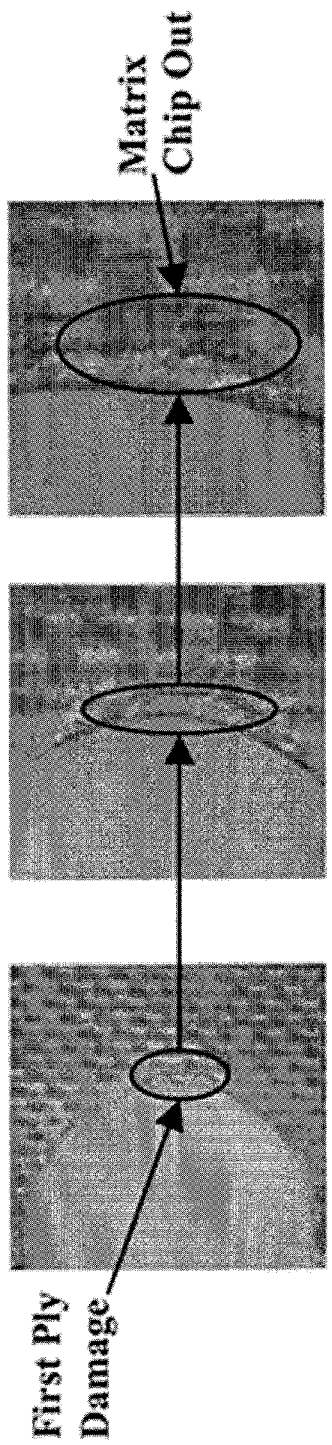
FIG. 7 illustrates damage in surface ply of a shear plan of C1 have loaded to 15 kn.
Figure 8:
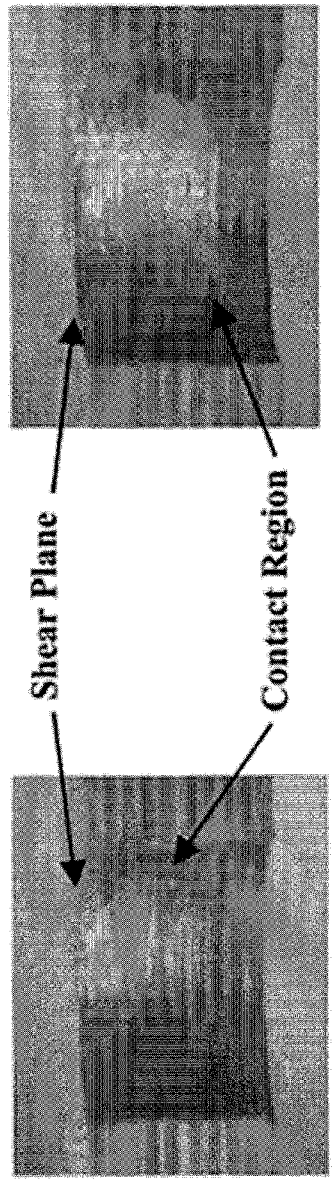
FIG. 8 illustrates the contact area for holes with clearance C1 and C4.
Figure 9B:
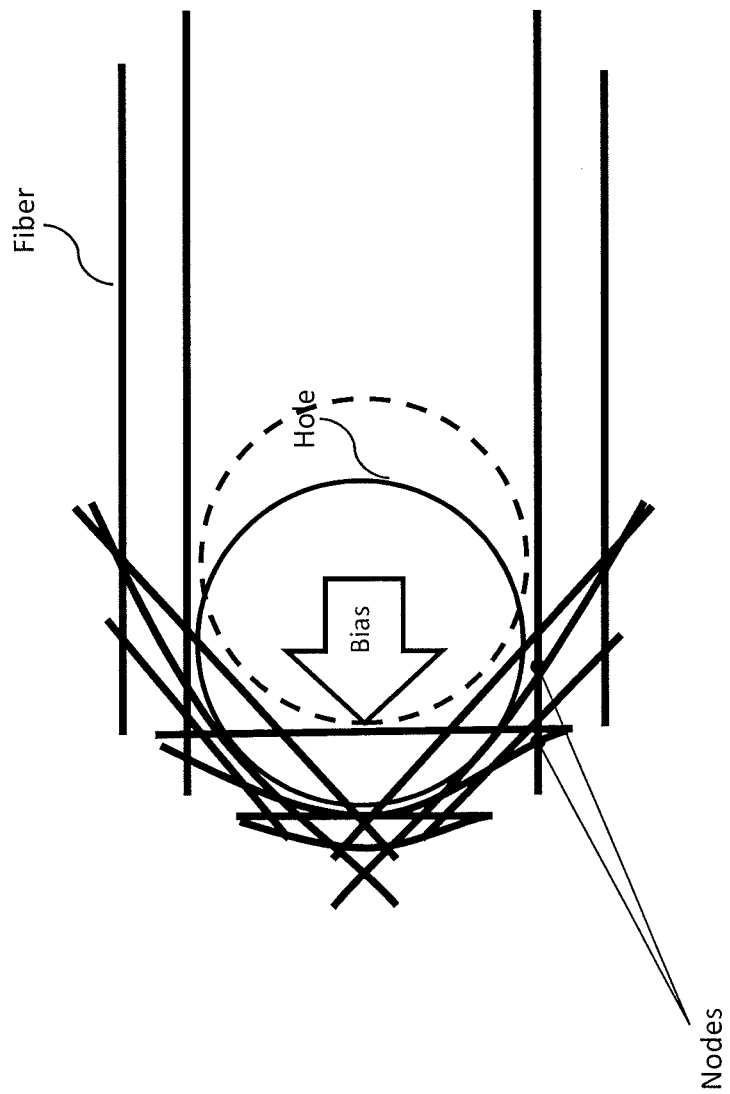
FIG. 9b illustrates a close-up diagram of fibers under high-bearing loads.

As general background, types of bearing damage exhibited by composite structures will be briefly discussed. FIG. 1 illustrates an example single-shear testing method setup. As illustrated, to test the strength of a composite laminate coupon, the test fixture and composite laminate coupon were pulled in opposing directions (i.e., directions A and B). FIGS. 2a through 2c illustrate example failures that may result from the traditional pinned-joint configuration test of FIG. 1. Specifically, FIG. 2a illustrates a tension failure, FIG. 2b illustrates a shear-out failure, and FIG. 2c illustrates a bearing failure. Indeed, the sizing of a composite laminate structure may be adjusted to mitigate bearing failure. For example, the (1) material thickness, (2) ply orientation, and/or (3) edge distance (e.g., the distance between the edge of a hole punch and the nearest edge of the composite laminate structure) of a composite laminate structure may be adjusted to increase resistance to bearing failure. FIG. 3 provides a graph illustrating traditional bearing stress vis-à-vis pin displacement, while FIG. 4 is a graph illustrating load-displacement curve for pin-loaded (90/±45) laminates. The bearing load is indicated in testing as a drop in the linier stress-strain relationship. As illustrated in the graph, a decrease from 2 e/D to 1 e/D (i.e., edge distance, in units of hole diameter) results in a 30% decrease in bearing resistance. FIGS. 5a through 5d illustrate images of example bearing failures, while FIG. 6 illustrates a bearing failure while using bolt and washer. Finally, FIG. 7 illustrates damage in surface ply of a shear plane of c1 has loaded to 15 kn, while FIG. 8 illustrates the contact area for holes with clearance c1 and c4. Turning now to FIG. 9a, a close-up diagram is illustrated of traditional fibers under a moderate bearing load. As illustrated in FIG. 9b, the fibers are displaced as the bearing load increases (i.e., in the direction of bias). In fact, as illustrated, the fibers begin the slide at the nodes (e.g., the fibers intersection points) as the bearing load continues to increase. If the bearing load continues to increase, a composite material having traditional fibers will ultimately sheer (as discussed above). Therefore, it is evident that traditional methods are deficient, and ultimately fail, when higher loads are involved.

However, the above limitations may be overcome by employing an Integrated Composite Bearing (ICB) 100 that provides a localized optimization of: material thickness; ply orientation; and compression resistant high density. An example ICB 100 is illustrated in various stages of bias via FIGS. 10a through 10c. In certain aspects, the ICB 100 may be disk-shaped and may comprise a densified portion 102 and a pluraility of filament tendrils 104 extending with a bias in one direction. Indeed, an ICB 100, which may be added to a composite structure during layup, can act as a support structure within the composite structure. Essentially, an ICB 100 increases the bearing strength, while more effectively transferring load from the fastener location (e.g., a hole 106 and surrounding material) into the composite structure (e.g., a composite panel having an ICB 100). In certain aspects, the hole 106 may be substantially concentric with said hole densified portion 102. That is, the hole 106 may be positioned at the approximate center of said densified portion 102. While the ICB 100 is described and illustrated as being generally circular (e.g., a densified composite disk), such ICBs 100 may be virtually any shape desired for a particular application. Thus, while the ICB 100's densified portion 102 is generally illustrate and described as being disk-shaped, other shapes are antipated and may be employed to accommodate a particular application or design need. For example, the densified portion 102 may be oval, amorphous, triangular, quadrilateral (e.g., square, rectangular, trapezoidal,etc.), or virtually an other polygon.

In operation, the densified portion 102 resists bearing load while the tendrils route stress from the fastener location (e.g., a hole, bearing, or other connector) more directly to fibers in the composit panel. That is, the plurality of filament tendrils 104 may be configured to encircle at least a portion of the fastener location so as to form, for example, a "U" shape around said fastener location. The distal ends of each of said pluraility of filament tendrils 104 may extend into the composite structure (e.g., away from the edge and towards to center) so as to counter the effect increased bearing loads in the direction of the bias arrow. In other words, the filament tendrils 104 transfers the tensile load and redistributes it through a larger area of the composite structure to prevent pull-out at the fastener location, while the densified portion 102 resists compression to prevent elongation of the hole (e.g., as illustrated in FIGS. 5a to 5d). Thus, it is beneficial to have both filament tendrils 104 and a densified portion 102 matrix material distributed around the hole 106 in order to mitigate both (1) failure types in any direction, and (2) to allow for greater misalignment tolerance when placing the composite bearing within the composite structure lay-up.

The densified portion 102 is preferably a tough, hardened material. For instance, the densified portion 102 may be fabricated from a combination of fibrous, high-tensile material like carbon fiber, aramid fiber, or nano-filament combined with a stiffening matrix of material like ceramic, metal (e.g., titanium and/or stainless steel), or high-strength plastic. The diameter of the densified portion 102 area may be approximately 1.5 to 3 times the diameter of the hole, depending on material thickness and load on the fastener. That is, higher loads may warrant a larger densified portion 102 area, while a thicker densified portion 102 area may permit a smaller diameter. Further, higher loads may warrant a densified portion 102 area having a higher density, which may reduce the size of the densified portion 102 area needed for a particular application. For example, a chart showing optimal sizes and materials requirements (e.g., density and/or geometry) throughout various load scenarios may be used. In certain aspects, the densified portion 102 may employ a gradient thickness or density. For example, the side (or portion) of the densified portion 102 adjacent the edge of the composite structure may be thicker (or denser) than the opposite side of the densified portion 102 when the bearing load is biased towards the edge of the composite structure. Thus, a side of the densified portion 102 expected to endure higher loads may be thicker or denser than the other poritons of the densified portion 102.

The filament tendrils 104 may be fabricated from carbon fiber or other materials used in the primary structure (e.g., the composite structure). For example, the fibrous tendrils may be fabricated using raw tow (e.g., carbon, Kevlar, fiberglass etc.) and a tool that wraps the raw tow according to engineering specification. In certain aspects, the tool may be similar to a filament braider, in that it uses multiple spools on rotating gimbals moving in opposite directions to weave an axial braided tube, or sock, which expands in diameter.

Figure 10A:
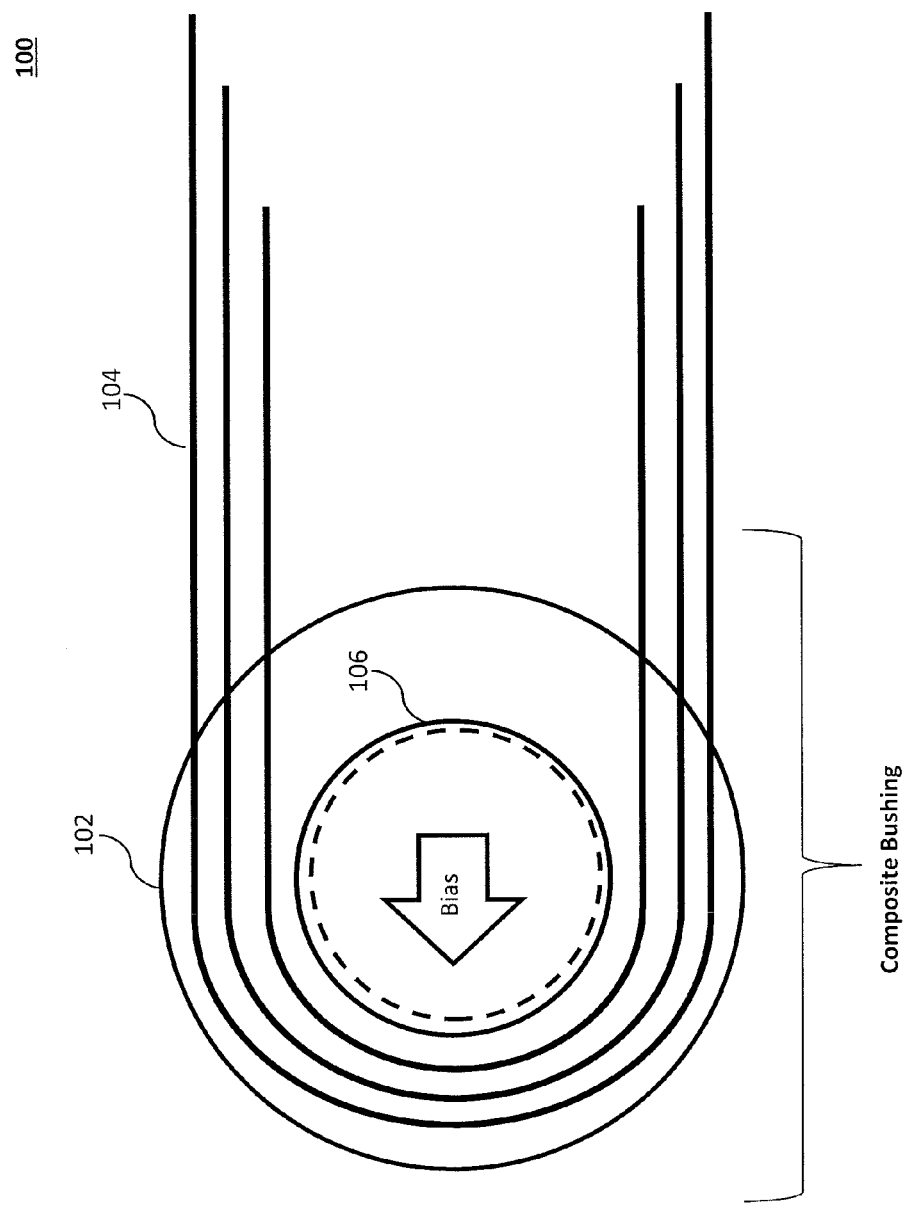
FIG. 10a illustrates a close-up diagram of Integrated Composite Bearing fibers under zero-bearing loads.
Figure 10B:
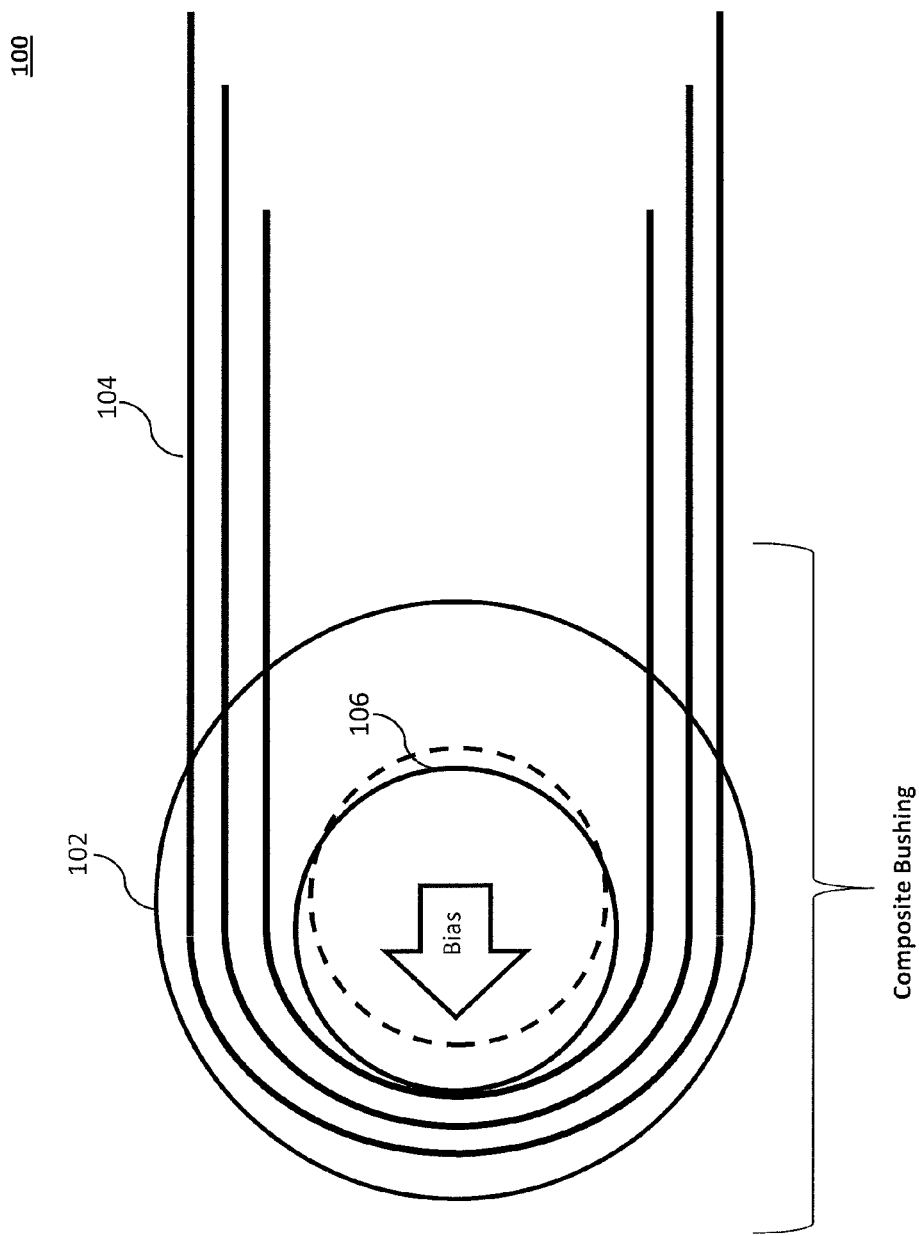
FIG. 10b illustrates a close-up diagram of Integrated Composite Bearing fibers under moderate-bearing loads.
Figure 10C:
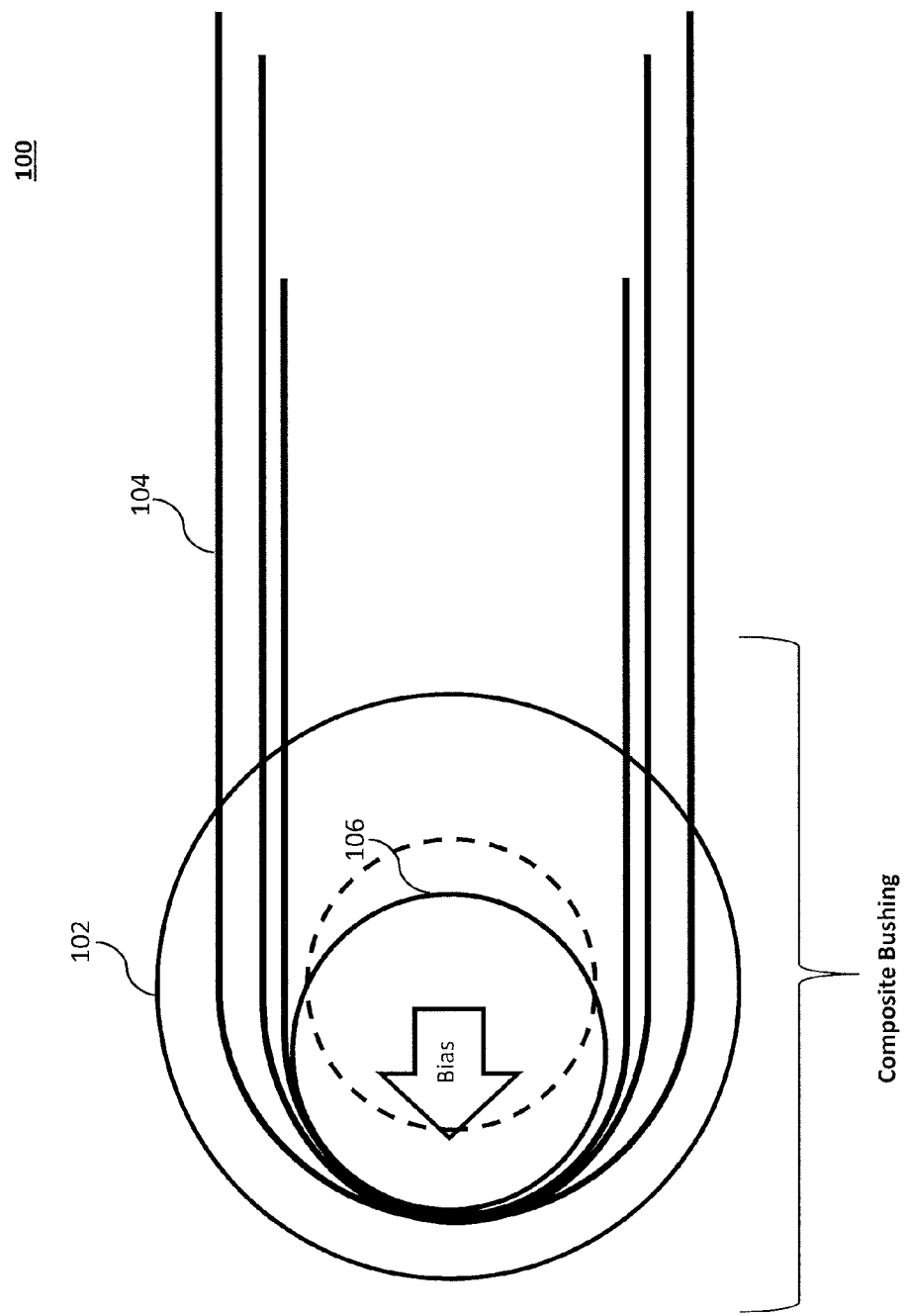
FIG. 10c illustrates a close-up diagram of Integrated Composite Bearing fibers under high-bearing loads.

As illustrated in FIGS. 10a through 10c, the tendrils may be configured to wrap around the center of the fastener location (e.g., hole 106) to create a "U" shape, thereby routing the load away from the side of the hole 106 adjacent the edge of the composite structure and reducing the required edge distance (i.e., the distance between the hole's edge and the edge of the component). While three tendrils are illustrated in the figures, one of ordinary skill in the art would recognize that greater, or fewer, tendrils may be employed to meet a particular need. That is, areas that are expected to be subjected to greater loads may employ additional tendrils to further increase strength.

Unlike the fiber arrangement of FIGS. 9a and 9b, the "U" shape filament tendrils 104 of FIGS. 10a through 10c are configured to surround the hole, thereby reducing risk of edge breakage. That is, the ICB 100 increases the bearing strength as well as more effectively transferring the load from the fastener to the panel. Indeed, as the load increases, rather than sliding at the nodes (as in FIG. 9b) and ultimately cause edge failure, the filament tendrils 104 of FIG. 10c (higher load) simply route the load away from the edge-side of the hole and towards the larger portion of the composite structure, for example, towards the center of the composite structure. Indeed, the ICB 100 focuses load paths and reduces the need for large "picture frame" double-plys (e.g., added material along the periphery of the composite structure), thereby reducing weight and labor time. Thus, the ICB 100 of FIGS. 10a through 10c further reduces the amount of edge distance required in the composite structure 200, thereby reducing weight and enabling a more compact design.

The fiber arrangement is also amenable to hole 106 misalignment because a precise edge distance is not entirely necessary, thus adding additional tolerance to reduce scrap material and reducing tooling costs.

The ICB 100 may be pre-impregnated with resin or stored dry. The ICB 100 is capable of being laminated into a layup coupon using pre-impregnated resin systems ("pre-preg", i.e., composite fibers having uncured matrix material already present) and film adhesive. For example, the ICB 100 may be constructed from a high performance tough epoxy matrix (e.g., IM7-8552 material available from Hexcel Corporation, or equivalent thereof), using an autoclave cure cycle. When pre-impregnated, the ICB 100 may have a more limited shelf life and limited compatibility with other resins. To extend the usable life of a pre-impregnated ICB 100, it is preferable to store the ICB 100 under colder conditions. Dry materials, however, have less logistical challenges in that they have a long shelf life and are compatibility with virtually any resins, but often necessitate a layer of film adhesive or resin to properly wet out during installation.

Figure 11A:
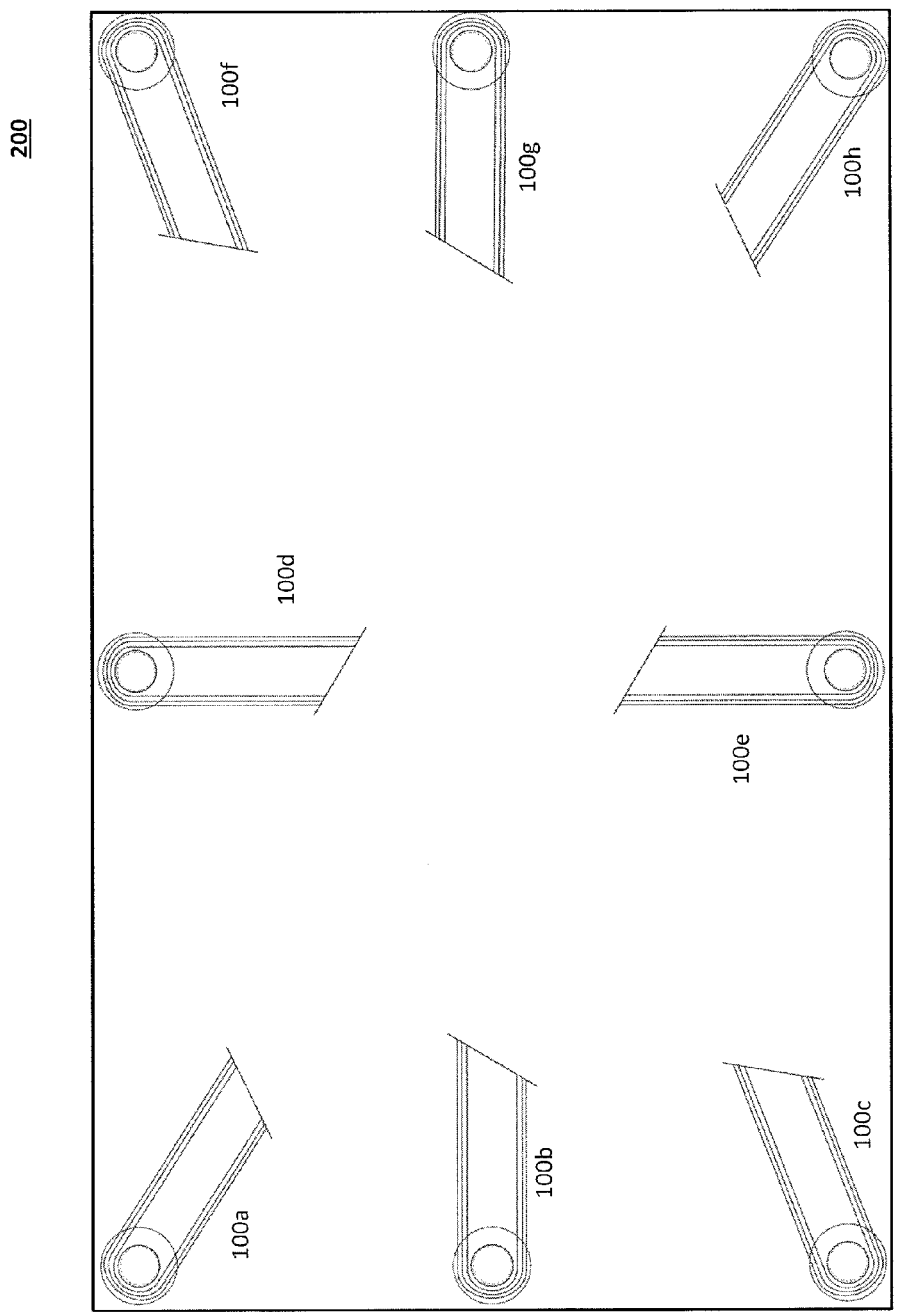
Figure 11C:
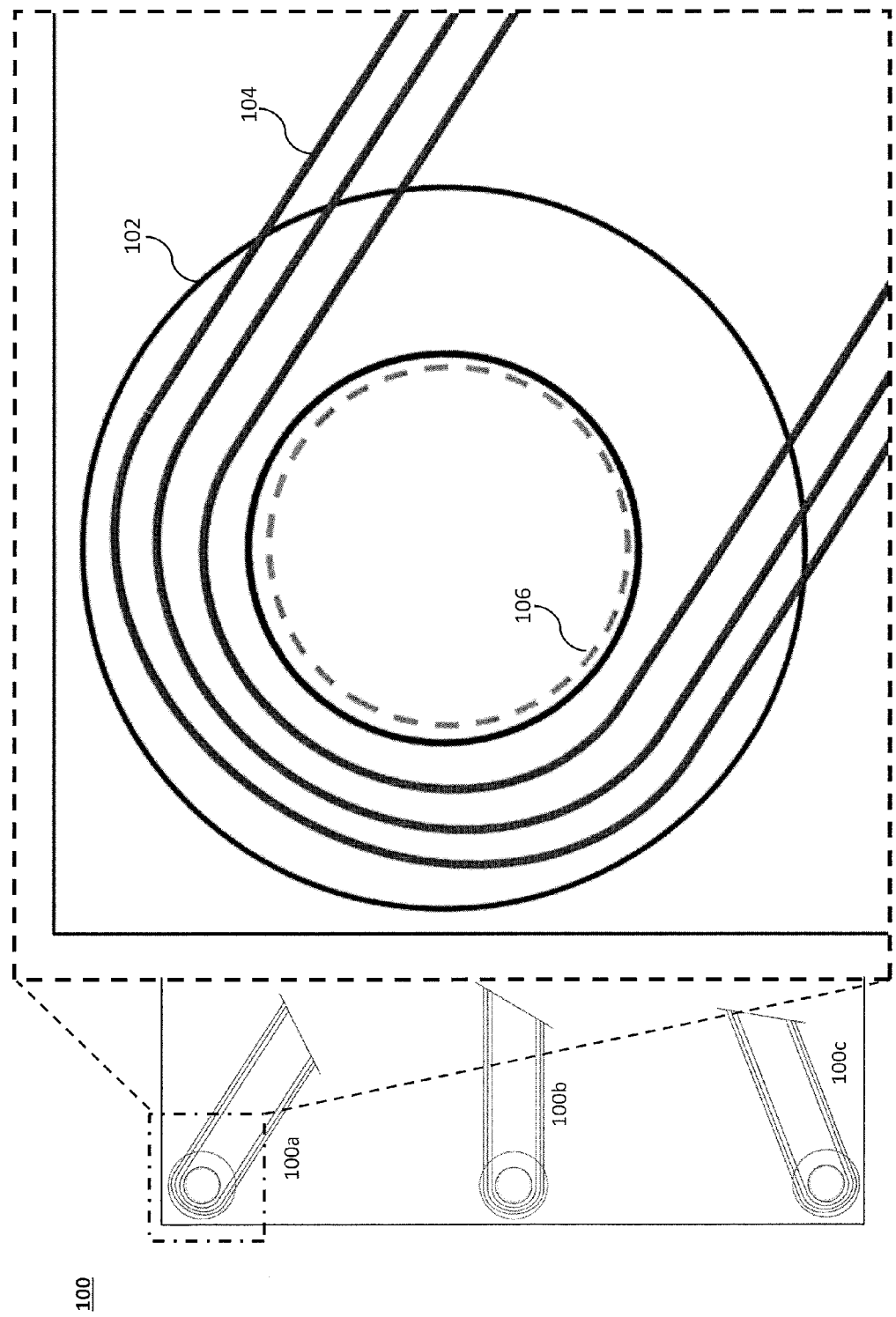

An ICB 100 may be installed by hand in a composite structure 200 using the same practices as typical composite hand layup. Specifically, FIGS. 11a through 11c illustrate an example composite structure 200 having a plurality of ICBs 100 installed thereon (i.e., ICB 100a-ICB 100h). The plurality of ICBs 100 may be installed during, for example, a hold step that can be added to an automated layup process in order to allow the ICBs 100 to be placed. As illustrated in FIG. 11b, an ICB 100 may be laid up such that the 102 is adjacent a single edge of the composite structure and the filament tendrils 104 extend perpendicularly (with reference to the adjacent edge of the composite structure 200) inwardly (e.g., towards the center of the composite structure 200) into the composite structure 200, as illustrated by ICBs 100b, 100d, 100e, and 100g. Alternatively, as illustrated in FIG. 11c, an ICB 100 may be laid up in a corner such that the 102 is adjacent two edges of the composite structure and the filament tendrils 104 extend inwardly at an angle into the composite structure 200 (e.g., towards the center), as illustrated by ICBs 100a, 100c, 100f, and 100h. Depending on the strength needed, the filament tendrils 104 may be configured to extend a substatnial distance into the composite structure 200. The tendril length may be determined, and measured, as a function of the hole's diameter or material thickness. For example, while the lengths may vary from case to case (e.g., depending on the anticipated load), the tendril length may be the longer of (a) 10 to 50 times the hole diameter, or (b) 20 to 100 times the material thickness. For instance, if the hole is 1 centimeter in diameter, the tendrils may be 10 to 50 centimeters long, but may be longer depending upon the thickness of the material.

In certain embodiments, the filament tendrils 104 of a first ICB 100 may traverse the entire composite structure 200 so as to couple with a second ICB 100. For example, the filament tendrils 104 of ICB 100b may extend entirely across composite structure 200 to couple with the filament tendrils 104 of ICB 100g, whereby a single filament tendril 104, or set of filament tendrils 104, may be employed.

To evaluate the strength of the above-described fiber arrangement, flatwise tensile testing was performed using an ASTM D5961-C single-shear fixture. The following coupons were tested: Coupon 1: 12-ply, quasi-isotropic layups; Coupon 2: 8-ply, quasi-isotropic layup with Integral Composite Bearings under full-body plys, wherein all coupons had the same mass. During the strength testing, the coupon was fabricated using HexPly® 8552 material, although an equivalent thereof would be acceptable, and cured according to the Hexcel-recommended autoclave cure cycle. The ICB 100 sample illustrated a greater resistance to bearing failure and pull-out, thus allowing for a reduction in material thickness and edge band distance. As would be understood to those of ordinary skill in art, HexPly® 8552 is an amine cured, toughened epoxy resin system supplied with unidirectional or woven carbon or glass fibers. HexPly® 8552 is recommended for structural applications requiring high strength, stiffness, and damage tolerance and can operate in environments of up to 250° F.

To evaluate the effects of hole misalignment to the above-described fiber arrangement, flatwise tensile testing was performed using an ASTM D5961-C single-shear fixture. The following coupons, constructed from 8-ply, quasi-isotropic layup with Integral Composite Bearings under full-body plys, were tested: Coupon 1: 0.25-inch hole misalignment of 0.06-inch; Coupon 2: 0.25-inch hole misalignment of 0.12-inch; and Coupon 3: 0.25-inch hole misalignment of 0.25-inch. During the strength testing, the coupon material was, again, IM7-8552 and cured according to the hexcel-recommended autoclave cure cycle. Results indicated that the margin provided by the ICB allowed for higher misalignment tolerances, which may reduce the cost of scrap, maintenance review board evaluation, and tooling precision. For example, using traditional methods, scrap rate for composites manufacturing can be as high as 70% for hand layup, averaging lower in automated manufacturing.

The weight savings of this optimization process would reduce operating costs of vehicles and increase their operating envelope. The above technology would be entremely beneficial for aircraft and spacecraft use due to the high value of weight. However, the value of implementing this technology could prove cost effective in other high-performance systems such as automobiles, marine craft, and energy systems such as wind or hydro-electric turbines. Moreover, military aircraft would benefit from this technology, specifically rotorcraft, spacecraft, and airship systems.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A composite aircraft structure comprising:
   an aircraft body portion having a first density;
   a disk-shaped densified portion comprising ceramic, metal, high-strength plastic, or a combination thereof, wherein the disk-shaped densified portion includes a hole positioned at an approximate center of said disk-shaped densified portion,
   wherein the densified portion has a density that is greater than said first density and is configured to resist a load imparted via said hole; and
   a plurality of filament tendrils,
   wherein the plurality of filament tendrils is configured to wrap around at least a portion of said hole to form a form a "U" shape,
   wherein at least one of said plurality of filament tendrils comprises a carbon fiber material, a para-aramid synthetic fiber material, or a fiberglass material,
   wherein said plurality of filament tendrils is configured to direct stress away from said hole and into the aircraft body portion.

2. The composite aircraft structure of claim 1, wherein said densified portion's diameter is approximately 1.5 to 3 times said hole's diameter.

3. A composite bearing for use in a composite structure, the composite bearing comprising:
   a densified portion to resist a load imparted upon the composite bearing at a hole positioned at an approximate center of said densified portion; and
   a plurality of filament tendrils encircling at least a portion of said hole,
   wherein the plurality of filament tendrils are configured to direct stress away from the hole and into the composite structure.

4. The composite bearing of claim 3, wherein the plurality of filament tendrils form a "U" shape around said at least a portion of said hole.

5. The composite bearing of claim 3, wherein the composite bearing is disk-shaped.

6. The composite bearing of claim 3, wherein at least one of said plurality of filament tendrils comprises a carbon fiber material.

7. The composite bearing of claim 3, wherein at least one of said plurality of filament tendrils comprises a para-aramid synthetic fiber material.

8. The composite bearing of claim 3, wherein at least one of said plurality of filament tendrils comprises a fiberglass material.

9. The composite bearing of claim 3, wherein said densified portion's diameter is approximately 1.5 to 3 times said hole's diameter.

10. The composite bearing of claim 3, wherein said densified portion comprises ceramic, metal, high-strength plastic, or a combination thereof.

11. A composite structure comprising:
    a composite material body portion;
    a densified portion to resist a load imparted via a hole positioned at an approximate center of said densified portion; and
    a plurality of filament tendrils wrapped around at least a portion of said hole to direct stress away from said hole and into the composite material body portion, wherein at least a portion of each of said plurality of filament tendrils is embedded within said composite material body portion.

12. The composite structure of claim 11, wherein the plurality of filament tendrils form a "U" shape around said at least a portion of said hole.

13. The composite structure of claim 11, wherein the densified portion is disk-shaped.

14. The composite structure of claim 11, wherein at least one of said plurality of filament tendrils comprises a carbon fiber material.

15. The composite structure of claim 11, wherein at least one of said plurality of filament tendrils comprises a para-aramid synthetic fiber material.

16. The composite structure of claim 11, wherein at least one of said plurality of filament tendrils comprises a fiberglass material.

17. The composite structure of claim 11, wherein said densified portion's diameter is approximately 1.5 to 3 times said hole's diameter.

18. The composite structure of claim 11, wherein said densified portion comprises ceramic, metal, high-strength plastic, or a combination thereof.

19. The composite bearing of claim 3, wherein the densified portion is embedded within the composite structure.

20. The composite structure of claim 11, wherein the densified portion is embedded within the composite material body portion.

* * * * *